UNITED STATES PATENT OFFICE.

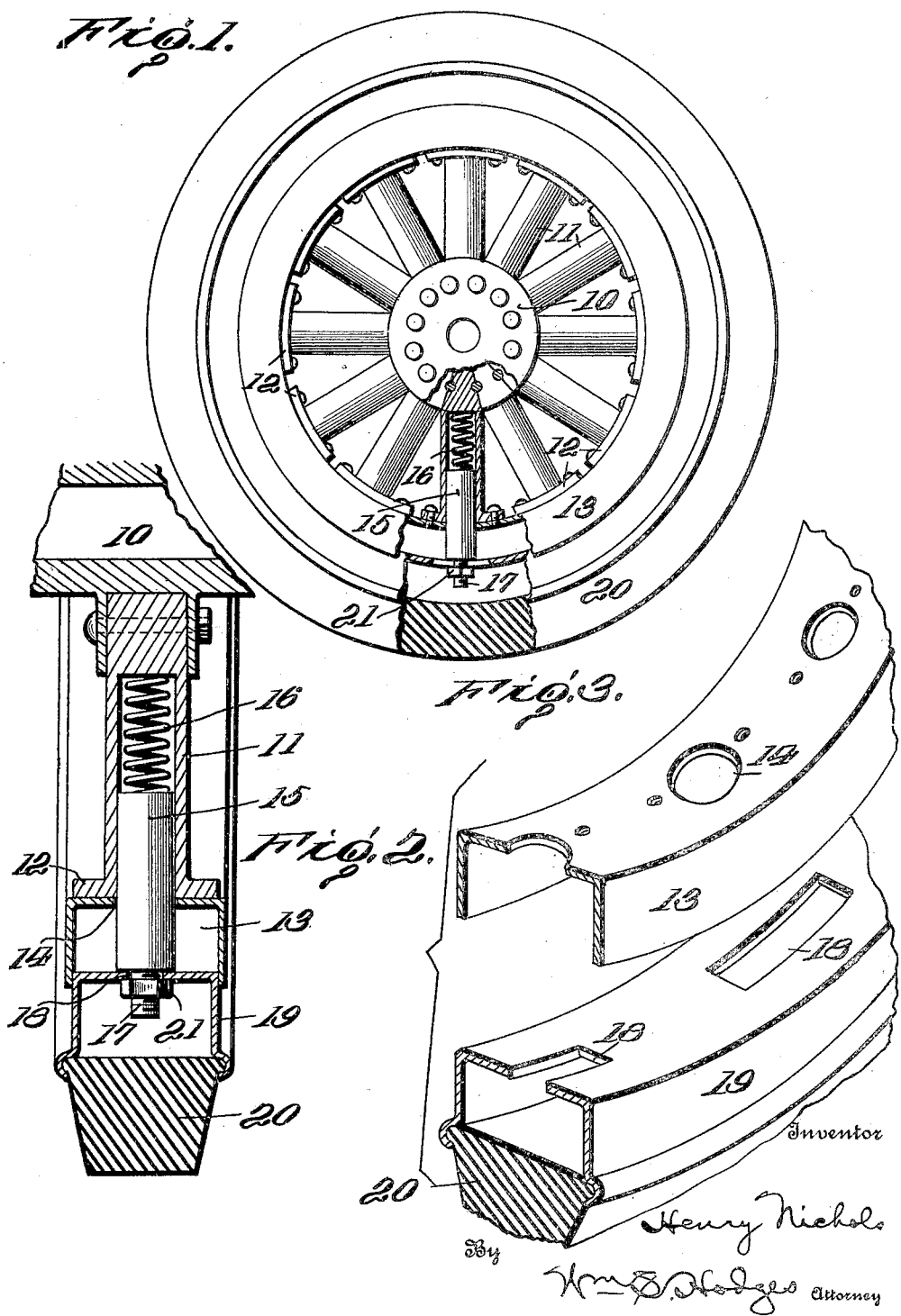

HENRY NICHOLS, OF NEWARK, NEW JERSEY.

RESILIENT WHEEL.

1,397,140.    Specification of Letters Patent.    Patented Nov. 15, 1921.

Application filed April 21, 1919. Serial No. 291,690.

*To all whom it may concern:*

Be it known that I, HENRY NICHOLS, a citizen of the United States, residing at Newark, in the county of Essex and State of New Jersey, have invented a new and useful Resilient Wheel, of which the following is a specification.

This invention is a wheel of the type in which the tread is resiliently connected to the body of the wheel.

One of the objects of the invention is to provide an inexpensive wheel of simple construction which will be sufficiently strong to withstand the ordinary loads applied to motor vehicle wheels and yet possess sufficient resiliency to render pneumatic tires unnecessary. A further object is to provide a wheel of the character referred to in which the parts may be readily separated and reassembled for purposes of repair or adjustment.

The invention will be hereinafter fully set forth and particularly pointed out in the claim.

In the accompanying drawing:—

Figure 1 is a side elevation, partly in section, illustrating a wheel constructed in accordance with the invention. Fig. 2 is a transverse sectional view. Fig. 3 is a detail view illustrating the tread member.

Referring to the drawing, 10 designates the hub, provided with a plurality of radiating tubular spokes, 11, the inner ends of which fit within suitable recesses in the hub, the outer ends being provided with flanges 12, which are curved to conform to the felly 13. Said felly is substantially inverted U-shaped in cross section, and provided with holes 14 in alinement with the bores of the spokes 11. The flanges 12 of the spokes are secured to the felly in any desired manner.

Working within the spokes 11 are plungers 15, bearing at their inner ends against springs 16 located within said spokes. The outer ends of the plungers 15 are reduced, as indicated at 17, to provide bearing shoulders positioned to bear against the inner edge of a tread member 19. The reduced ends 17 extend through slots 18 in the tread member 19. Said tread member is of a shape similar to that of the felly 13, and telescopes within the felly so as to have a radial movement therein. Said felly may be formed of a plurality of sections or one of the flanges may be made detachable for convenience in assembling the tread member therewith. The tire 20 is secured within the tread member in any suitable manner. The reduced ends 17 are engaged by nuts 21 which retain the tread member 19 in place.

In practice, the plungers 15 are normally forced outwardly by the springs 16, and the weight of the load is sustained from the tread member by said plungers and springs. By reason of the slots 18, the tread member is permitted to have a certain amount of circumferential movement, thereby reducing the strains incident to the driving torque.

From the foregoing it will be seen that the wheel described is exceedingly simple in construction but possessing great strength and durability. The springs 16 provide all of the resilience necessary and at the same time are sufficiently strong to withstand the usual load.

Having thus described the nature of the invention and explained an operative manner of constructing and using the same, although without attempting to set forth all of the forms in which it may be made, or all of the forms of its use, what is claimed is:—

A wheel of the character described comprising a hub, a felly provided with side flanges, tubular spokes rigidly connecting the hub and the felly, a rim of approximate U-shape slidably mounted between said flanges and provided with a tire, the inner wall of said rim having longitudinal slots formed therein, plungers working in said spokes and bearing against the inner wall of the rim, said plungers having reduced threaded portions extended through said slots, nuts working on said threaded portions and engaging the opposite face of the inner wall of said rim, and springs within the spokes forcing the plungers normally outward, the slots in the rim permitting limited circumferential movement of the rim.

In testimony whereof I have hereunto set my hand.

HENRY NICHOLS.